H. W. VAUGHAN.
ATTACHMENT TO BEVEL SQUARES.
APPLICATION FILED MAR. 30, 1917.

1,292,164.

Patented Jan. 21, 1919.
2 SHEETS—SHEET 1.

Witnesses.
Michele Cimbalo
James H. Deering

Inventor.
Harry Wilton Vaughan.

UNITED STATES PATENT OFFICE.

HARRY WILTON VAUGHAN, OF SAN FRANCISCO, CALIFORNIA.

ATTACHMENT TO BEVEL-SQUARES.

1,292,164.      Specification of Letters Patent.      Patented Jan. 21, 1919.

Application filed March 30, 1917. Serial No. 158,568.

*To all whom it may concern:*

Be it known that I, HARRY WILTON VAUGHAN, a citizen of the United States, residing at San Francisco, in the county of San Francisco and State of California, have invented a useful Attachment to Bevel-Squares, and of which the following is a specification.

The invention shall be known and designated as the "rafter-protractor" bevel-square attachment.

This invention provides an attachment for a bevel-square—a tool commonly used by carpenters, which can be set at any desired angle—that will enable any person with knowledge of common arithmetic to find and lay out instantly the various saw-cuts, (angles) and to find the various lengths of all the various kinds of rafters that are used in the most common pitches of roofs of dwelling houses and buildings, where the roof comprises pitch-roofs.

The word "pitch" as used herein is the term of the carpenter and the builder, and corresponds with its respective number of degrees to the horizontal, and is that part of the roof known as the slant, and will be used hereinafter in the aforesaid terms.

The invention enables any one regardless of technical knowledge to find the various cuts for rafters, cuts for polygons and miters for open string stairs.

It is the purpose of this invention to simplify the means of and save time in framing roofs, polygons and stairs.

This specification, together with the drawings furnish a description, the purpose of, and the manner in which the invention is to be used.

This invention does not provide for any improvement on the bevel-square, except as regards the feasibility of this invention, and will be described later in the specification.

The invention further provides the means to instantly find the various miter cuts, for all of the most common polygons, without the necessity of having the technical knowledge for finding these cuts with the use of the "steel square."

The invention provides also for the miter-cuts to be found on the stair stringers of stairs, having the most common treads and risers, where the open-string stairs are used.

The invention consists of the most simple features and details of construction, and the combination of parts will hereinafter be more clearly set forth by reference to the illustrations in the accompanying drawings, and pointed out in the appended claims.

Figure 1:
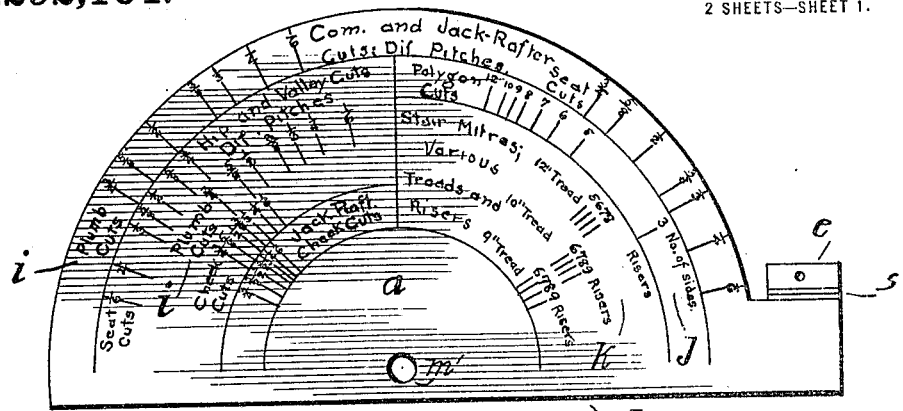
Figure 2:
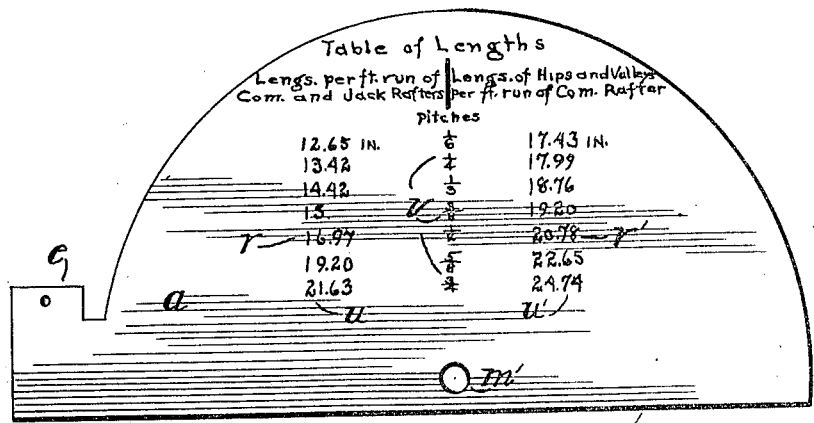

Referring to the drawings forming a part of these specifications, Figures 1 and 2 are respectively obverse and reverse views of the "rafter protractor" bevel-square attachment. On the obverse side Fig. 1 is shown the different cuts (angles) stamped thereon; and after the invention is attached to the bevel-square the center ($g$) of the blade ($h$) (Fig. 4) is to be placed directly opposite the cut desired as stamped on the obverse side of the attachment.

Figure 3:
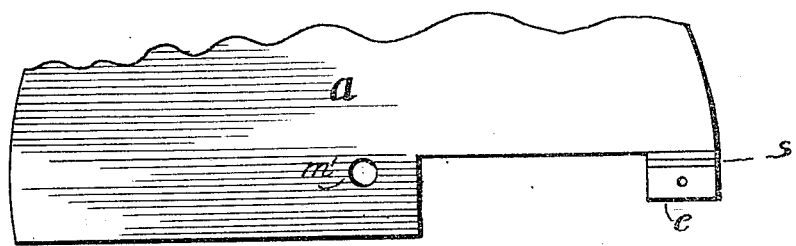

Fig. 3 is a part view of Figs. 1 and 2, showing another means for securing the attachment to the bevel-square, should it prove that the metal to be used in the manufacture be too thick to allow a bottom edge ($b$)— which is shown to be cut in a different manner—being inserted in the slot ($c$) of the handle ($d$) of the bevel-square. In either case the guide ($e$) is fastened in the same manner by means of a small screw ($f$).

Figure 4:
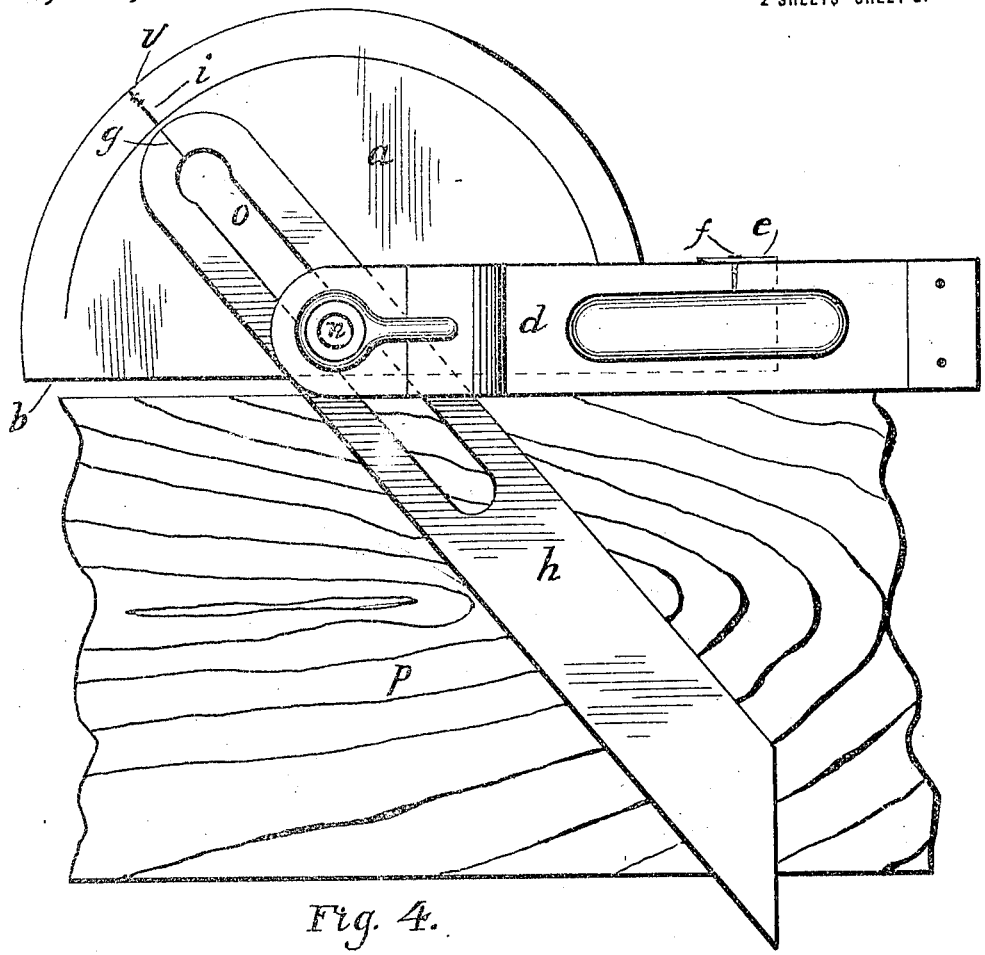

Fig. 4 is a view showing the invention attached to the bevel-square with a center ($g$) of the blade ($h$) set in position to correspond with the plumb-cut ($i$) of a common rafter of a one-half pitch roof ($v$) and shows the handle of the bevel-square in position against the edge of a timber ($p$) upon which should be marked the angle or cut as has just been found, with the use of this invention. The center ($g$) of the blade ($h$) set in any corresponding position will readily give the user the desired cut (plumb or seat) of any desired rafter of any desired pitch. Likewise the center ($g$) of the blade ($h$) set in any corresponding position for the polygon cuts ($j$) will give the user the desired miter-cut for any desired polygon.

Miter-cuts for open stairs—stringers of any of the various most common risers and treads ($k$) can be obtained by placing the center ($g$) of the blade ($h$) to correspond with any desired cut for a given riser and tread.

Figures 5, 6:

Fig. 5 shows a washer ($l$) made the thickness of the blade ($h$) with a hole ($m$) equal to the diameter of the pin ($n$), and with flat edges, inserted in the slot ($o$) of the blade ($h$), to take up the lateral play which exists in all bevel-square blades. To afford successful manipulation of the attachment there must be no lateral play in the blade of the bevel-square. The attachment ($a$) fits into the slot (c) of the handle (d) of the bevel-square that is provided for the blade (h), and the blade-pin (n) inserts through the pin-hole (m¹) of the attachment (a) to hold it secure at that point to the handle (d), and which is the center of radiation of the blade (h).

Fig. 6 shows in detail the guide (e), after being bent at a right angle, and screwed in place against the edge of the handle (d). Fig. 6 also shows the slot (c) in the handle (d) in which is inserted the blade (h) together with the attachment (a) so that the blade (h) when in use is lying flat on the surface of the attachment (a).

On the reverse side of the attachment Fig. 2 is shown a table of lengths of common, hip and valley and jack rafters per foot of run (horizontal projection) of common rafters. This table is to be used to obtain the length of any given rafter of any of the given pitches by multiplying the corresponding numbers (u) opposite the pitches (v) by the span of the common rafter, which varies in all cases of different buildings. To illustrate, assume a one-half pitch roof, assume the span of the common rafter to be 10 ft. multiply the number (r) opposite the one-half pitch in the column (u) for common rafters by 10, and the result will be the length in inches. For the lengths of the hip and valley rafters, multiply the number (r¹) opposite the one-half pitch in the column (u¹) for hips and valleys by 10 (the span for the common rafter) and the result will be the length in inches; divide by 12 to get the result in feet. For jack rafters, column (u) multiply the number (r) opposite the one-half pitch by its own respective span in feet, which varies in each case, and which is equal to the distance, spaced from the seat of the hip. If the distance be 2½ ft. multiply the respective number (r) by 2½, and the result will be in inches; divide by 12 to get the result in feet.

In Figs. 1 and 3, at the guide (e) is shown lines (s) scored in that part of the attachment to meet the requirements of different sizes of bevel-squares on the market, and the guide (e) should be bent at a right-angle at one of the lines (s) according to the size of the bevel-square in use. This is essential since the edge (b) must always remain in a position parallel to the edge of the handle (d) for the attachment to be kept in a permanent positive position, so that the figures thereon may not deviate in reference to the radial point (the pin hole (m¹).

The following description of the various "cuts" will tend to make clear their meaning.

Plumb-cut=the cuts of the rafters where they meet at the peak of the roof.

Seat-cut=the horizontal cut where it rests on the plate of the walls of the building.

Cheek-cut=the miter of a hip valley, or jack rafter that fits against the side of another rafter, because of its having a different angle and points in a different direction thereto.

Having thus described the invention, what is claimed is:—

1. An attachment to a bevel-square comprising, a flat semi-circular disk having means provided to allow the blade-pin of a bevel square to pass through the said disk in the center of a circle of which said disk is a semi-circle, a protruding guide having means provided to allow a small screw to pass through said guide and a plurality of horizontal lines scored thereon, having markings on the obverse side for plumb and seat cuts for common and jack rafters for various pitches of roofs, for "plumb" "seat" and "cheek" cuts for hip and valley rafters for various pitches of roofs and for "cheek" "cuts" for jack rafters for various pitches of roofs, for polygonal miter cuts for their various numbers of sides and for stair-stringer miter cuts for various risers and treads, and having markings on the reverse side comprising a table of lengths, per foot of horizontal projection of common rafter, for common and jack and hip and valley rafters for various pitches of roofs.

2. An attachment to a bevel-square comprising, a flat semi-circular disk having means provided to allow the blade-pin of a bevel square to pass through the said disk in the center of a circle of which said disk is a semi-circle, said disk being provided with an extension, having a protruding guide, having means provided to allow a small screw to pass through said guide and a plurality of horizontal lines scored thereon, having markings on the obverse side for plumb and seat cuts for common and jack rafters for various pitches of roofs, for "plumb" "seat" and "cheek" cuts for hip and valley rafters for various pitches of roofs and for "cheek" "cuts" for jack rafters for various pitches of roofs, for polygonal miter cuts for their various numbers of sides and for stair-stringer miter cuts for various risers and treads, and having markings on the reverse side comprising a table of lengths, per foot of horizontal projection of common rafter, for common and jack and hip and valleys rafters for various pitches of roofs.

3. An attachment to a bevel-square comprising, a flat semi-circular disk having means provided to allow the blade-pin of a bevel square to pass through the said disk in the center of a circle of which said disk is a semi-circle, said disk being provided with an extension, having a protruding guide, having means provided to allow a small screw to pass through said guide and a plurality of horizontal lines scored thereon, having markings on the obverse side for plumb and seat cuts for common and jack rafters for various pitches of roofs, for "plumb" "seat" and "cheek" cuts for hip and valley rafters for various pitches of roofs and for "cheek" "cuts" for jack rafters for various pitches of roofs, for polygonal miter cuts for their various numbers of sides and for stair-stringer miter cuts for various risers and treads, and having markings on the reverse side comprising a table of lengths, per foot of horizontal projection of common rafter, for common and jack and hip and valley rafters for various pitches of roofs, in combination with a flat washer, made to fit the slot in the blade of a bevel-square with two straight parallel sides.

4. An attachment to a bevel-square comprising, a flat semi-circular disk having means provided to allow the blade-pin of a bevel square to pass through the said disk in the center of a circle of which said disk is a semi-circle, said disk being provided with an extension, having a protruding guide, having means provided to allow a small screw to pass through said guide and a plurality of horizontal lines scored thereon, having markings on the obverse side for plumb and seat cuts for common and jack rafters for various pitches of roofs, for "plumb" "seat" and "cheek" cuts for hip and valley rafters for various pitches of roofs and for "cheek" "cuts" for jack rafters for various pitches of roofs, for polygonal miter cuts for their various numbers of sides and for stair-stringer miter cuts for various risers and treads, and having markings on the reverse side comprising a table of lengths, per foot of horizontal projection of common rafter, for common and jack and hip and valley rafters for various pitches of roofs, in combination with a flat washer, made to fit the slot in the blade of a bevel-square with two straight parallel sides, substantially as set forth in combination with a bevel-square by inserting the bottom edge of said attachment in the slot of the handle of said bevel-square inserting said washer in the blade of said bevel-square assembling the parts so that the blade-pin-hole in said handle, the hole in said washer and the hole in said disk being in true alinement, by inserting the blade pin of said bevel-square through said holes and tightening same and a small screw through the hole of said guide and screwed into said handle.

In testimony whereof I affix my signature in the presence of two witnesses.

HARRY WILTON VAUGHAN.

Witnesses:
MICHELE CIMBALO,
JAMES H. DEERING.

Copies of this patent may be obtained for five cents each, by addressing the "Commissioner of Patents, Washington, D. C."